US009658849B2

(12) United States Patent
Kenney et al.

(10) Patent No.: US 9,658,849 B2
(45) Date of Patent: *May 23, 2017

(54) PROCESSOR SIMULATION ENVIRONMENT

(71) Applicant: Imperas Software Ltd., Oxfordshire (GB)

(72) Inventors: James Kenney, Oxfordshire (GB); Simon Davidmann, Oxfordshire (GB)

(73) Assignee: IMPERAS SOFTWARE LTD., Oxfordshire (GB)

( * ) Notice: Subject to any disclaimer, the term of this patent is extended or adjusted under 35 U.S.C. 154(b) by 494 days.

This patent is subject to a terminal disclaimer.

(21) Appl. No.: 13/770,243

(22) Filed: Feb. 19, 2013

(65) Prior Publication Data

US 2013/0173887 A1    Jul. 4, 2013

Related U.S. Application Data

(63) Continuation-in-part of application No. 12/307,636, filed as application No. PCT/GB2007/050385 on Jul. 6, 2007, now Pat. No. 8,417,508.

(30) Foreign Application Priority Data

Jul. 6, 2006   (GB) .................................. 0613409.2
May 2, 2007   (GB) .................................. 0708497.3

(51) Int. Cl.
*G06F 9/455* (2006.01)
*G06F 9/30* (2006.01)
(52) U.S. Cl.
CPC ........ *G06F 9/30003* (2013.01); *G06F 9/3004* (2013.01); *G06F 9/30043* (2013.01); *G06F 9/30087* (2013.01); *G06F 9/455* (2013.01)

(58) Field of Classification Search
CPC .... G06F 9/455; G06F 9/45504; G06F 9/4552; G06F 9/45554
(Continued)

(56) References Cited

U.S. PATENT DOCUMENTS 5,832,205 A * 11/1998 Kelly ....................... C09K 8/34
                                                        711/204
6,397,242 B1 * 5/2002 Devine et al. .................... 718/1
(Continued)

OTHER PUBLICATIONS

Swanson et al.("An Evaluation of Speculative Instruction Execution on Simultaneous Multithreaded Processors", ACM, Aug. 2003, pp. 314-340).*

(Continued)

*Primary Examiner* — Thai Phan
*Assistant Examiner* — Iftekhar Khan
(74) *Attorney, Agent, or Firm* — Saul Ewing LLP

(57) ABSTRACT

In a method of simulating a processor system by running code that simulates the system on a host processor, code is translated at run time to a form required by the host processor. All instructions are mapped to a native instruction set of the host using two or more different code dictionaries: the translated instructions are mapped to multiple and different dictionaries dependent on the execution privilege level or mode of the simulated processor. If an instruction is encountered during runtime that changes the mode of the processor the code dictionary is switched to use the dictionary associated with the new mode. The different modes require different instruction mappings to the native instruction set of the host using different models that more accurately represent the behavior of the system code and hardware in the system being simulated.

8 Claims, 11 Drawing Sheets

(58) Field of Classification Search
USPC .................................................. 703/24, 26
See application file for complete search history.

(56) References Cited

U.S. PATENT DOCUMENTS

| | | | | |
|---|---|---|---|---|
| 7,047,394 B1* | 5/2006 | Van Dyke | ........... | G06F 9/30167 703/26 |
| 7,281,102 B1* | 10/2007 | Agesen et al. | ................ | 711/163 |
| 7,647,589 B1* | 1/2010 | Dobrovolskiy | ..... | G06F 11/3644 710/260 |
| 8,521,504 B1* | 8/2013 | Chen | ................... | G06F 9/45504 703/26 |
| 8,768,680 B2* | 7/2014 | Cho | ......................... | G06F 9/44 703/21 |
| 2002/0147969 A1* | 10/2002 | Lethin | ................ | G06F 9/45504 717/138 |
| 2003/0079094 A1* | 4/2003 | Rajwar | ................ | G06F 9/3004 711/150 |
| 2005/0120160 A1* | 6/2005 | Plouffe | ............... | G06F 9/45537 711/1 |
| 2006/0069899 A1* | 3/2006 | Schoinas | ............... | G06F 12/109 711/206 |
| 2006/0168571 A1* | 7/2006 | Ghiasi | ..................... | G06F 9/505 717/127 |
| 2006/0253691 A1* | 11/2006 | Barraclough et al. | ........ | 712/244 |
| 2007/0078640 A1* | 4/2007 | Gabor | ................. | G06F 11/3457 703/21 |
| 2007/0294675 A1* | 12/2007 | Barraclough et al. | ........ | 717/137 |
| 2012/0110574 A1* | 5/2012 | Kumar | ................ | G06F 9/45558 718/1 |

OTHER PUBLICATIONS

Trevor Conrad Meyerowitz("Single and Multi-CPU Performance Modeling for Embedded Systems",University of California at Berkeley, 2008).*

* cited by examiner

PROCESSOR SIMULATION ENVIRONMENT

CROSS REFERENCE TO RELATED APPLICATIONS

This application is a continuation-in-part of U.S. application Ser. No. 12/307,636, filed Jul. 2, 2009, which claims the priority of International Application No. PCT/GB2007/050385, filed on Jul. 6, 2007, which claims priority to GB 0613409.2, filed Jul. 6, 2006 and GB 0708497.3, filed May 2, 2007, all of which are hereby incorporated in total by reference.

BACKGROUND OF THE INVENTION

1. Field of the Invention

This invention relates to a processor simulation environment. It enables single and multiple processor systems to be simulated by running code on a host processor.

2. Description of the Prior Art

The increasing complexity of the system code (software) running on processors has forced processors to have different execution privilege levels or modes. There can be many modes such as 'user', 'system', 'hypervisor'. These modes allow the processor to separate the context that the system code runs in for each mode.

The increasing use of multiple processors in the design of electronic systems has forced changes in the style of programming used. The parallel operation of multiple processors requires careful management of the instructions which require any READ or WRITE from the system memory. This is due to the fact that the memory is accessible to all the processors in the system and it is important that any such accesses occur in the correct order to maintain the integrity of data.

Early designs used TEST and SET instructions which controlled the read or write of a single location, verifying that the data was valid before it was passed to the part of the system that had requested it. The main drawback of this technique was that the TEST instructions set a semaphore which prevented all other processors accessing the memory until the SET instruction released it. This resulted in the entire system waiting for the semaphore to be released. Since data clashes in parallel systems are quite infrequent, this resulted in a lot of time spent waiting where there was no danger of data corruption.

A more recent and better technique is the use of SPECULATE and COMMIT instructions (see Hammond, L., Carlstrom, B., Wong, V., Hertzberg. B., Chen, M., Kozyrakis, C. and Olukotun, K., "Programming with Transactional Coherence and Consistency" *ASPLOS'04*, Boston, Mass., U.S.A., October 2004.). These instructions, like the TEST and SET ones, mark an area where memory access requires careful management. However, they differ in two ways: firstly, instead of dealing with a simple READ or WRITE instruction from a single location, the region between the SPECULATE and COMMIT instructions may include a long sequence of instructions which depend on the data from memory and, secondly, the SPECULATE instruction does not set a semaphore which prevents other processors from accessing the memory as the TEST instruction does. The full section of code, known as a transaction, within a SPECULATE/COMMIT region is atomic, i.e. it must either complete in its entirety or it will be deemed to have failed, resulting in a software exception.

The SPECULATE/COMMIT process relies on the use of local cache, known as the level 1 cache (FIG. 1) to store data while the series of instructions that make up the single transaction within a SPECULATE/COMMIT region is being completed. Each processor in the multi processor system has its own level 1 cache. When a SPECULATE instruction is encountered within the code, that instruction directs the processor to change the way that all data access is handled; all subsequent writes must remain within the level 1 cache and not propagate to shared memory or shared cache (FIG. 2). When a COMMIT instruction is encountered, all of the data which has been written to the level 1 cache within the SPECULATE/COMMIT region, known as speculatively written data, is propagated to more distant shared caches or memories within the multiprocessor system in a single atomic action (FIG. 3).

In the cases where a read or a write occurs within a SPECULATE/COMMIT region, the full line of data is copied from shared memory into the cache first (FIG. 4). This is to ensure that when a partial write occurs from the processor, the final data written back to shared memory can be guaranteed to be correct. If the data were not copied first from shared memory to local cache then the transfer of partial writes could lead to errors. This is because the parts of the data, which have not been updated in the cache, will retain previous values which are then subsequently passed back to the shared memory (FIG. 5). Copying the data from shared memory first and then overwriting guarantees the integrity of the data which is subsequently written back to shared memory (FIG. 4).

There are a two main reasons why a write will fail in this SPECULATE/COMMIT process. In SPECULATE mode, a write by a processor will fail if the write cannot be performed without causing another speculatively written cache line to be ejected from the level 1 cache. This occurs because the associativity of the cache, i.e. number of locations where data from any given address in memory may be stored, has been exceeded. A COMMIT instruction will fail if any of the speculatively written data would conflict with changes in the shared cache. This occurs if one of the other processors in the system writes to the same cache line address as the one which would have already been changed by the speculatively written data had that data been written direct to shared cache rather than level 1 cache. In some systems this may be detected by hardware and the exception taken immediately that the conflicting write occurs; in other systems, the exception may be deferred until the subsequent commit is encountered. Either type of failure will cause an exception to be taken. If this happens all the accumulated speculatively written data will be discarded.

Use of the SPECULATE/COMMIT instructions therefore results in faster processing as the delays associated with waiting for the semaphore to clear in the TEST/SET style have been removed. The only disadvantage is that, when the code in the SPECULATE/COMMIT region fails to complete properly, the exception handling needs to be more complex to deal with the fact that this is a block of multiple instructions and not a single memory access which has failed.

Simulating multi-processor systems requires changes to existing techniques in order to ensure maximum efficiency and hence simulation speed. One of the more commonly used techniques is that of code-morphing where the simulated processor code is run on the host processor of the machine on which the simulation runs. This is done by means of a code dictionary which, at run time, translates or morphs the code from its original form to the one required for it to run on the host processor.

SUMMARY OF THE PRESENT INVENTION

The invention is a method of simulating a processor system by running code that simulates the system on a host processor, in which: the simulated processor can run in various modes (which term includes execution privilege levels) determined by the execution sequence of instructions and by hardware state and which allow different access to resources in the processor. In this method, code is translated at run time to a form required by the host processor. All instructions are mapped to a native instruction set of the host using two or more different code dictionaries: the translated instructions are mapped to multiple and different dictionaries dependent on the execution privilege level or mode of the simulated processor. If an instruction is encountered during runtime that changes the mode of the processor the code dictionary is switched to use the dictionary associated with the new mode. The different modes require different instruction mappings to the native instruction set of the host using different models that more accurately represent the behaviour of the system code and hardware in the system being simulated.

For example:

for a multiple-processor system there is a mode of executing inside a speculate region and a mode of executing outside the speculate region as defined by a SPECULATE and a COMMIT instruction used to mark an area of memory, shared across several simulated processors, and for processors with a virtual memory capability the processor can be in a mode using virtual memory or a mode using physical memory, and This is more efficient and hence faster than known methods of simulation.

In an implementation, the processor mode is determined, and instructions are mapped to the dictionary associated with that mode.

Execution privilege levels or modes of processor include, but are not limited to:

System Mode—this is an unrestricted mode and allows the processor to access all of the resources of the processor and/or system User mode—this is a restricted mode and provides access to a subset of the resources of the processor and/0r system Hypervisor Mode Physical Address Access Mode Virtual Address Access Mode Complex Access Modes, such as when using SPECULATE/COMMIT regions For a multiple-processor system, instructions outside a SPECULATE/COMMIT region are mapped to the code dictionary associated with instructions outside a speculate region. But if a SPECULATE instruction is encountered during runtime by a simulator running the code, the instructions are mapped to a native instruction set of the host using a different code dictionary that is associated with instructions inside a speculate region. Instructions within the SPECULATE/COMMIT region are mapped to the native instruction set of the host using a different model that more accurately represents the multi-level memory of the final hardware implementation of the multi-processor system. When a COMMIT instruction is encountered, the mode of the processor changes and all instructions are mapped to the code dictionary associated with this mode.

Other implementation features include:

the multi-level memory allows the temporary storage of data associated with instructions within the SPECULATE/COMMIT region.

the second model accesses shared memory only via a level 1 cache associated with the processor handling that instruction.

simulating a failure of instructions within the SPECULATE/COMMIT region involves the simulator using knowledge of the associativity of the level 1 cache.

simulating a failure of instructions within the SPECULATE/COMMIT region involves the steps of:

(a) the simulator suspending simulation of a processor executing within the SPECULATE/COMMIT region in order to simulate another processor;

(b) the simulator traversing the data structure representing the level 1 cache to determine which lines of cache have had speculatively written data placed in them.

addresses containing speculatively written data are then observed by placing a watchpoint on the corresponding addresses in shared memory.

if simulating another processor leads to any of these watchpointed addresses being speculatively written to, the simulator will flag that speculation as failing for that processor.

resumption of simulation for the suspended processor requires checking whether any of the watchpointed addresses associated with that processor have been modified by another processor.

if a watchpointed address has been modified, then the simulator will direct the suspended processor to a simulated exception handler.

Another aspect of the invention is a multi-processor system that has been designed or tested using the simulation method defined above.

A further aspect is computer software operable to simulate a multi-processor system using the simulation method defined above.

A further aspect is a multi-processor development system when programmed with the computer software.

A final aspect is an electronic device including a multi-processor system that has been designed or tested using the simulation method defined above. Electronic devices include personal computers, servers, laptops, mobile telephones and indeed any other kind of device that includes a multi-processor system.

BRIEF DESCRIPTION OF THE DRAWINGS

The invention will be described with reference to the accompanying drawings.

DETAILED DESCRIPTION

Simulating Processor Systems with Different Execution Privilege Levels or Modes

As noted above, simulating processor systems requires changes to existing techniques in order to ensure maximum efficiency and hence simulation speed. One of the more commonly used techniques is that of code-morphing where the simulated processor code is run on the host processor of the machine on which the simulation runs. This is done by means of a code dictionary which, at run time, translates or morphs the code from its original form to the one required for it to run on the host processor.

During execution of system code a processor will exhibit different behaviours dependent on the execution privilege level or mode that it is executing in. The fast, efficient and accurate simulation of these different behaviours in the different modes requires special consideration.

Figure 11:
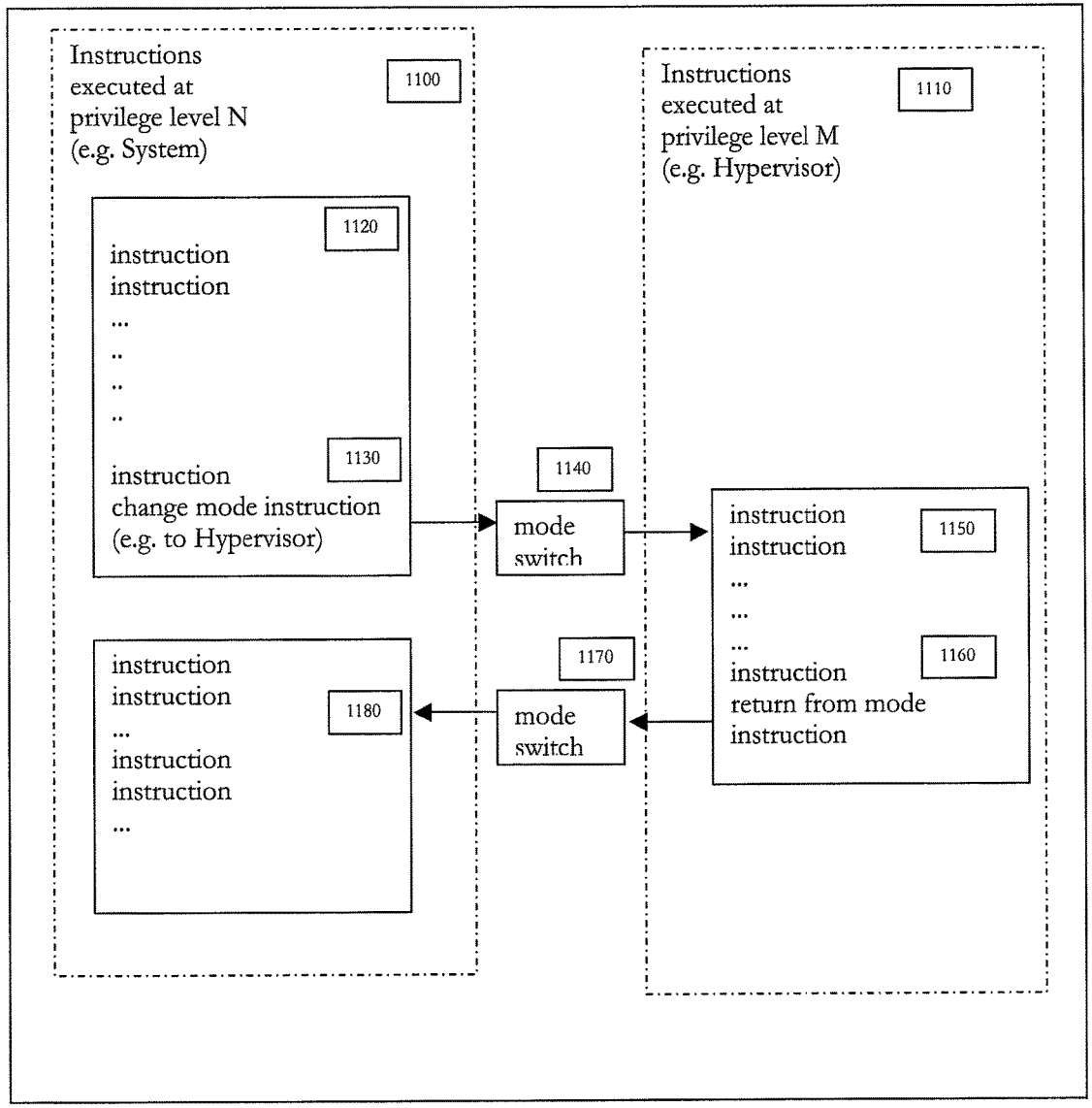
FIG. 11: Illustration of system code mode change

Execution privilege levels or modes of processors include, but are not limited to:
  i) System Mode—this is an unrestricted mode and allows the processor to access all of the resources of the processor and system
  ii) User mode—this is a restricted mode and provides access to a subset of the resources of the processor and system
  iii) Hypervisor Mode
  iv) Physical Address Access Mode
  v) Virtual Address Access Mode
  vi) Complex Access Modes, such as when using SPECULATE/COMMIT regions FIG. 11 shows an instruction stream being executed and mode switching. Instructions are executed in a mode, in this example two modes N and M are shown 1100 and 1110. These could be any processor mode or privilege level. Instructions are executed 1120 and at some point an instruction that requires a mode change is encountered 1130. A mode switch takes place 1140 in the processor and the new mode will have different privilege and resource access. Instructions are executed 1150 in this mode until an instruction is executed which again requires a mode switch to a another mode 1160. This could be a return to the previous mode, or could be moving to a new mode. The mode then switches 1170 and instructions are executed 1180 in the context of the new mode.

Different behaviours in the different modes can be classified as one of:
  a) requiring different address mapping of virtual to physical addresses for both simulated code execution and data accesses.
  b) requiring modifying the instructions in the system code that is being simulated dependent on the mode
  c) performing more complex accesses for modes like being in a SPECULATE/COMMIT region when simulating a multi-processor system Existing code morphing simulators translate instructions to be executed into a single code morphing dictionary and include instructions in that single dictionary that conditionally test for which mode the simulated processor is in and adding code into that single dictionary.

As the system code is executed on the simulated processor the different modes are identified and the system code instructions are translated into a different dictionary for each mode of the simulation enabling the simulation to be optimized for efficiency and performance.

Different Address Mapping Modes

Figure 12:
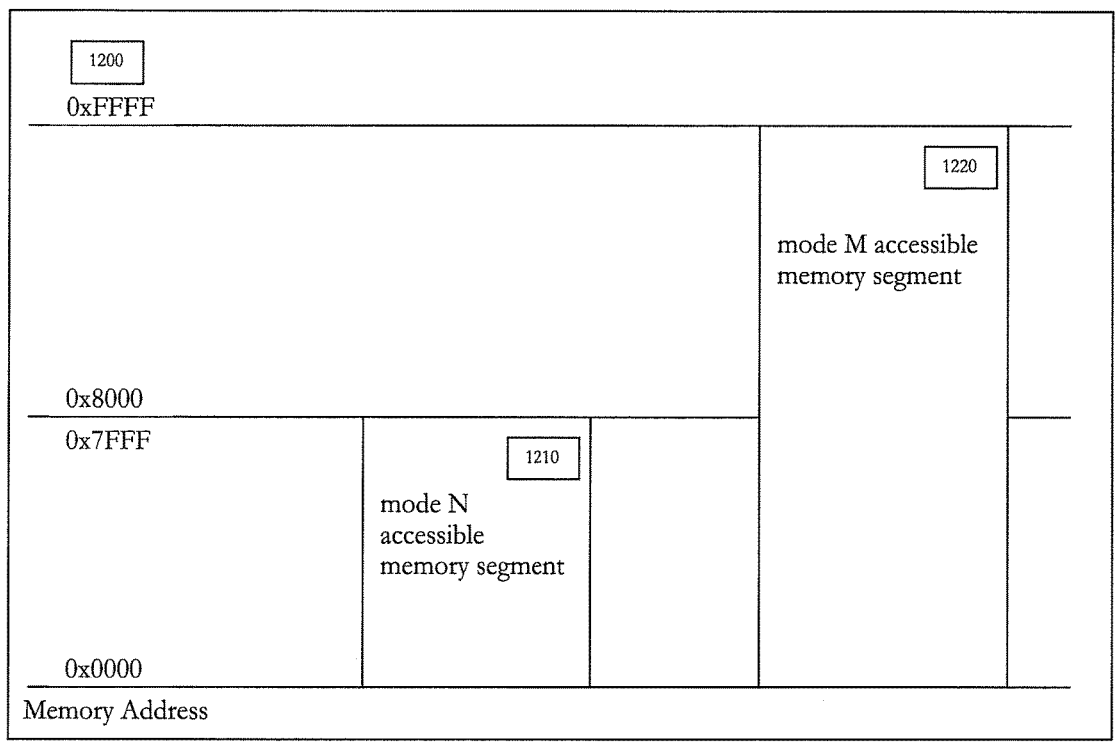
FIG. 12: Example of address mapping

To manage complex multi user and multi tasking system code, processors segment the available memory (FIG. 12) into multiple memory regions 1200 and enable different access rights to different regions 1210, 1220 dependent on the mode that the system code is executing in. System code executing in a system mode might have access to the whole memory 1220, while system code executing in a user mode or other restricted mode might have access only to a smaller memory region 1210, or might have access with restricted permissions. When executing in a mode where a memory access is allowed, then the access instruction is just executed, but in a mode where the access is illegal, then the processor executes different code such as illegal memory access exception reporting code.

These would be very different code streams and using a single code dictionary is very inefficient due to the use of multiple conditional branches that add significant complexity to the paths of execution in the dictionary.

For efficient simulation the different code for the different modes is translated and placed in different code dictionaries.

Figure 13:
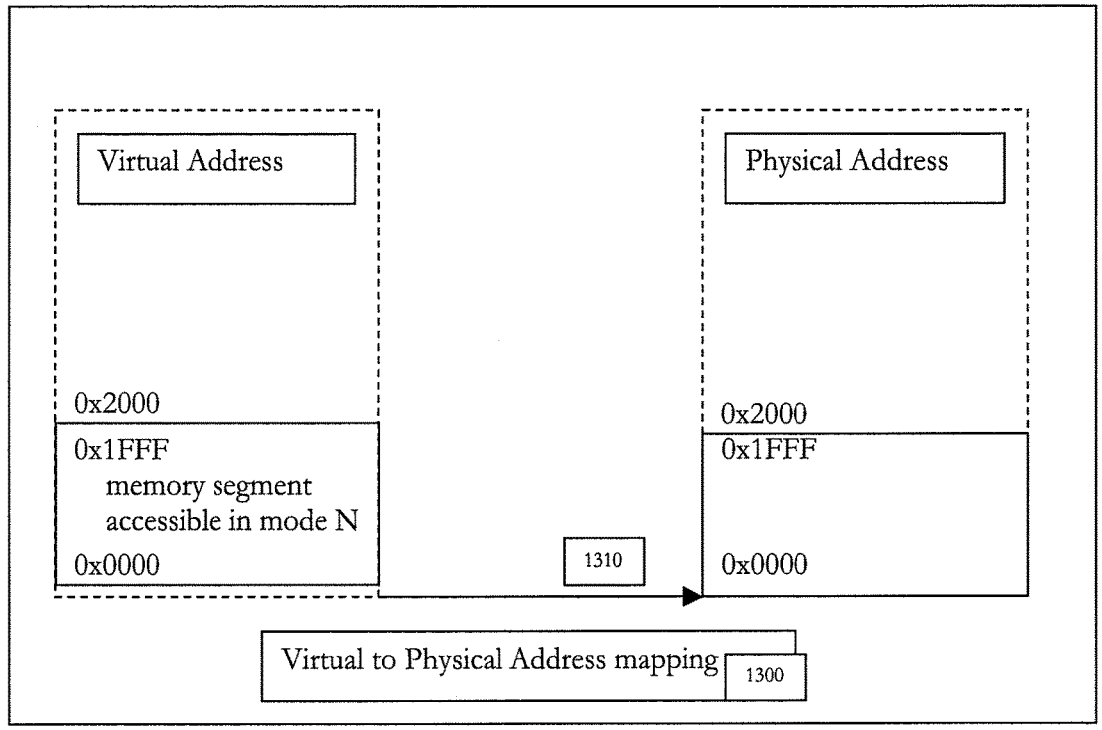
FIG. 13: Example of Virtual to Physical Address mapping
Figure 14:
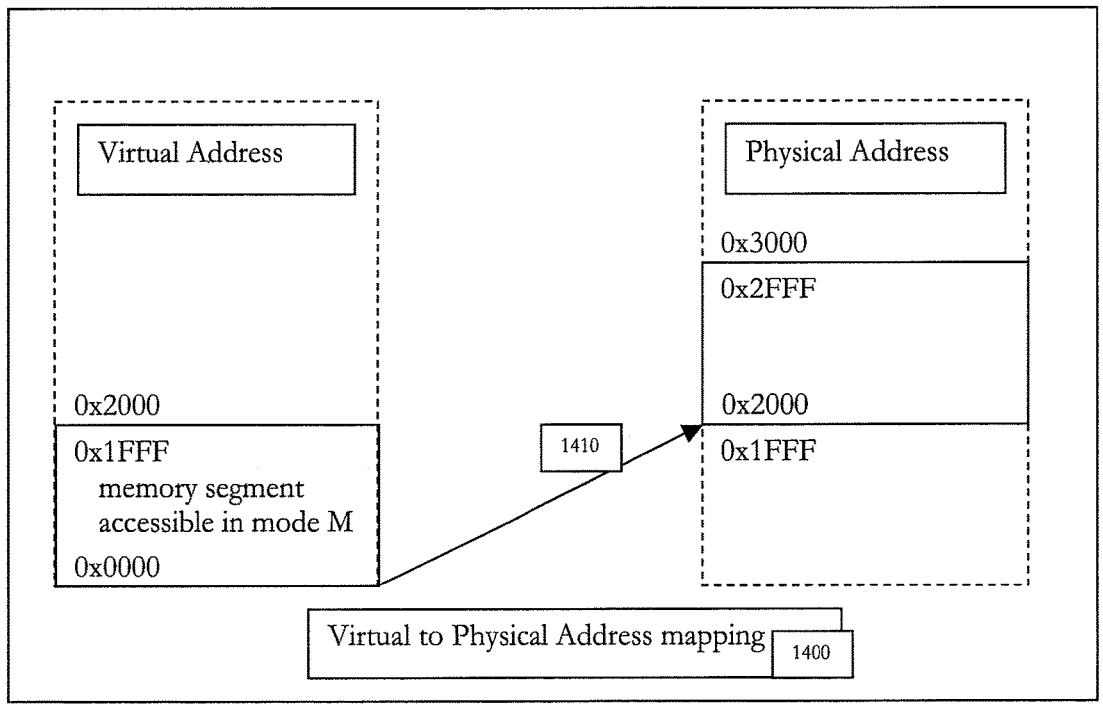
FIG. 14: Example of Virtual to Physical Address mapping in different mode

Different Address Mapping Modes Affecting Virtual to Physical Memory Address Translation Processors use translation tables (FIG. 13, FIG. 14) to map 1300, 1400 physical memory addresses into virtual memory addresses. This mapping from virtual memory address to physical memory address can be different for each of the different processor execution modes 1310, 1410. System code can be executed in different execution modes and the different execution modes will require different code to access the different memory locations These would be very different code streams and if using a single code dictionary would be very inefficient due to the use of multiple conditional branches and add significant complexity to the paths of execution in the dictionary.

For efficient simulation the different code for the different modes is translated and placed in different code dictionaries.

Modes that Require Modifying Instructions

Processors have different internal storage registers to hold data. The registers can be accessed by various system code instructions such as 'move from reg1 to reg2'. These registers can be general purpose registers or they can be system registers and an example instruction would be 'mov from SystemRegister to generalPurposeRegister'.

System registers may only be allowed to be accessed when in certain processor execution modes. For example in a user mode the System Registers may not be allowed to be accessed. In a mode that allows access, then an access instruction such as the move examples above is just executed, but in a mode where the instruction is illegal as the access to the SystemRegister is not allowed, then the processor executes different code such as illegal instruction exception reporting code.

These would be very different code streams and if using a single code dictionary would be very inefficient due to the use of multiple conditional branches and add significant complexity to the paths of execution in the dictionary.

For efficient simulation the different code for the different modes is translated and placed in different code dictionaries.

Complex Access Modes, for Example for SPECULATE/ COMMIT Region Modes

The simulation of the SPECULATE/COMMIT region of the code requires some special consideration. READ and WRITE instructions can be called both from within the SPECULATE/COMMIT regions and from outside it; these two calls need to be handled differently. The current execution can be considered to be in an 'inside SPECULATE/ COMMIT region mode' or 'outside SPECULATE/COMMIT region mode'. Outside any SPECULATE/COMMIT regions the simulation of memory access needs to be done as fast as possible using the host processor however within the SPECULATE/COMMIT regions a more complex model is required. This means that two models are required, where one model is written for speed of simulation and the other is more detailed for accuracy.

It is not possible to determine in advance, by static analysis of the simulated source code, whether a particular instruction is one which will be evaluated in a SPECULATE/COMMIT region or not. A function could, for example, be called from both inside or outside such a region. This would lead to a situation where the same OPCODE has to be run from both regions. This means that both the detailed model, for the call from within the SPECULATE/ COMMIT region, and the fast model, for the call from outside this region, need to be available at runtime and need to be selected in the code morphing process. Instructions found within the SPECULATE/COMMIT region need to be mapped to the complex model and its associated code dictionary while calls from outside this region need to be mapped direct to the host instruction set using a different mapping dictionary.

Multiple Dictionary Implementation Details

The technique used to simulate multiple modes using multiple dictionaries with maximum efficiency uses the processor system code mode changing instructions to switch the mapping dictionary so that when a mode changing instruction is encountered the code-morpher will use a different set of mapping instructions until another mode changing instruction is found. When the mode changing instruction occurs in the code, the mode changing instruction will complete, then the code dictionary used by the morpher will be switched back to the standard one again.

Figure 1:
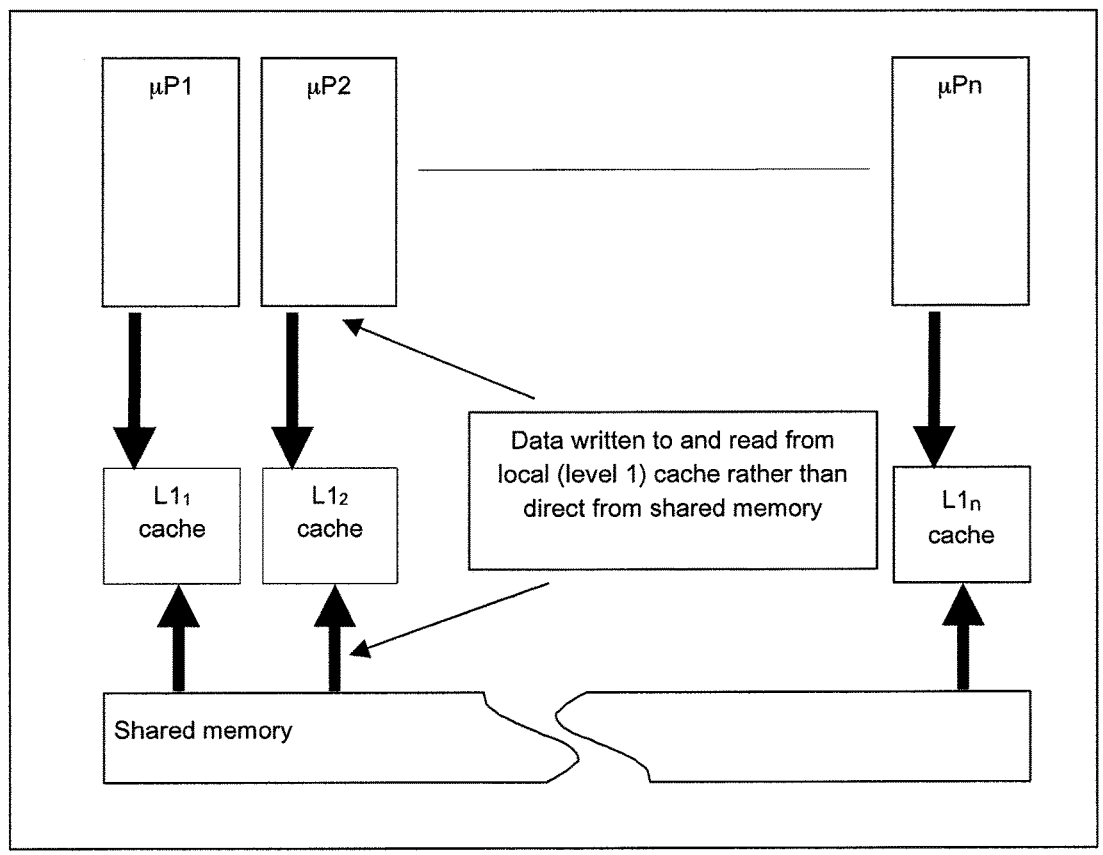
FIG. 1: Modelling of cache and shared memory in a multi-processor system in SPECULATE region of code.
Figure 2:
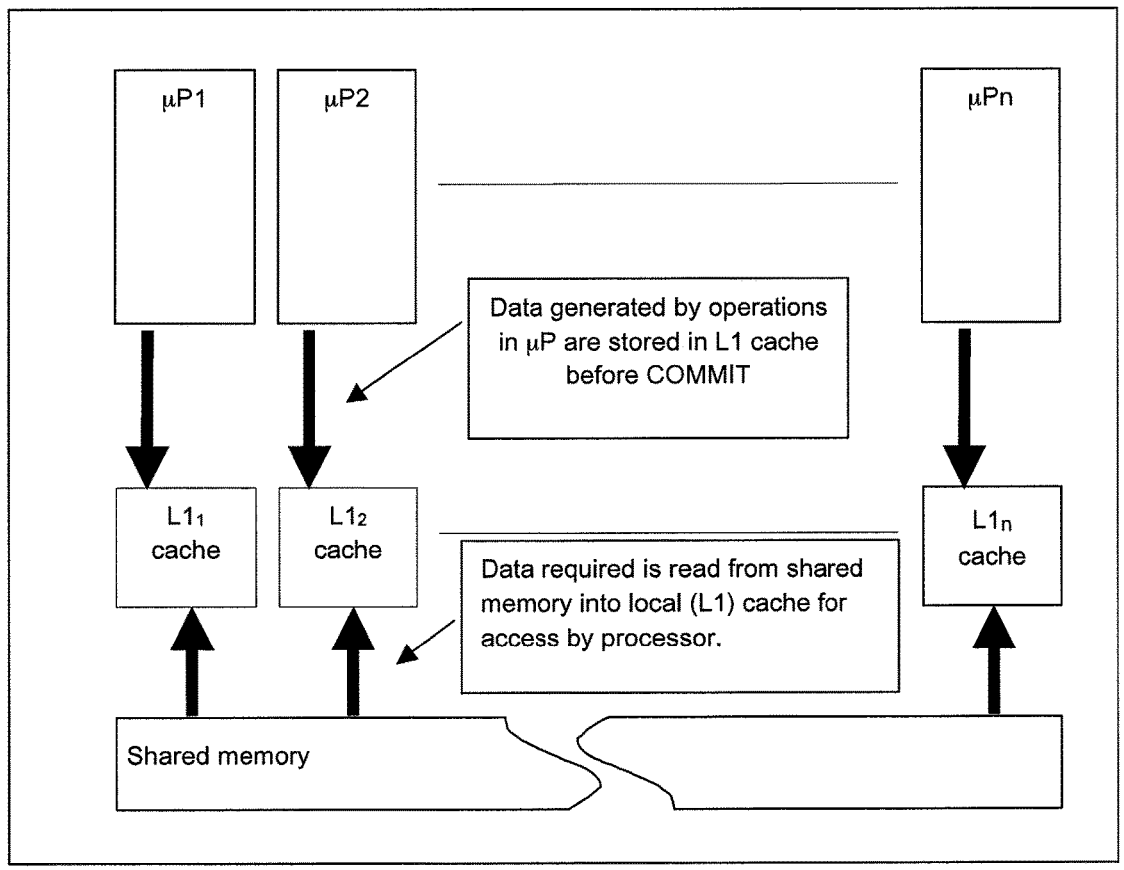
FIG. 2: All speculatively read and written data is held in local cache for access by the local processor only
Figure 3:
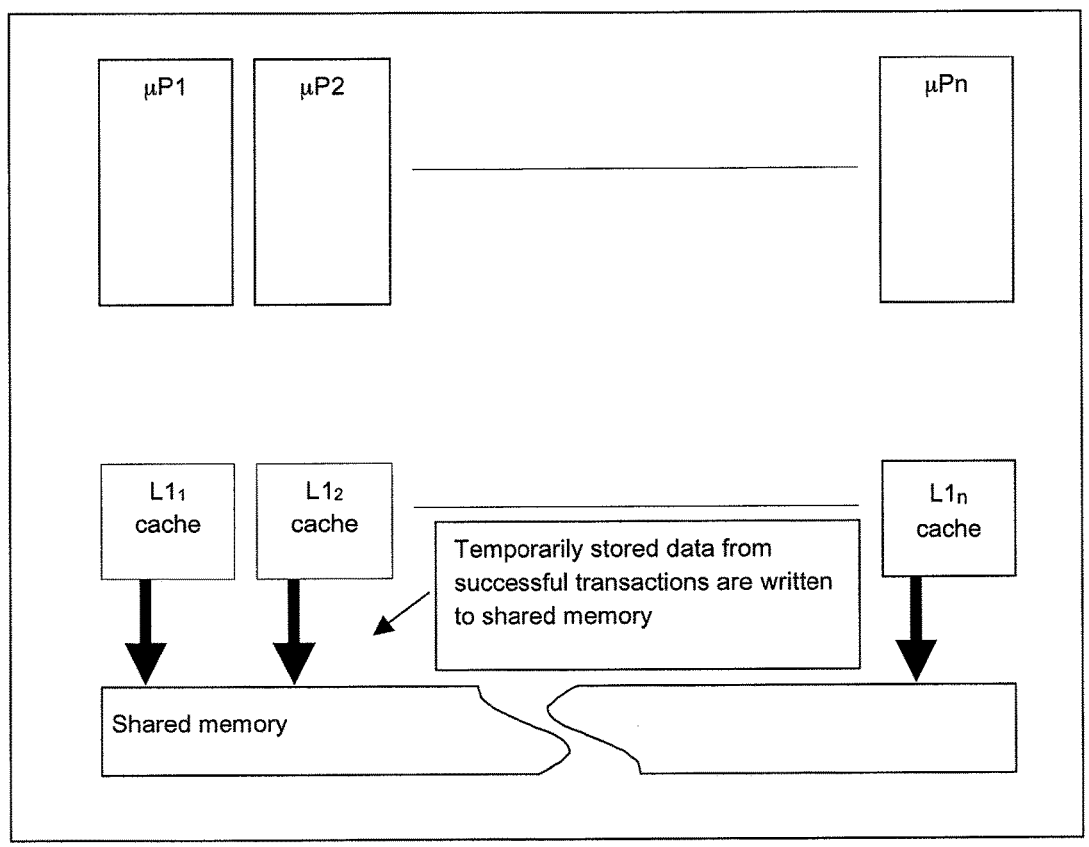
FIG. 3: All data from successful transactions is transferred to shared memory at COMMIT instruction
Figure 4:
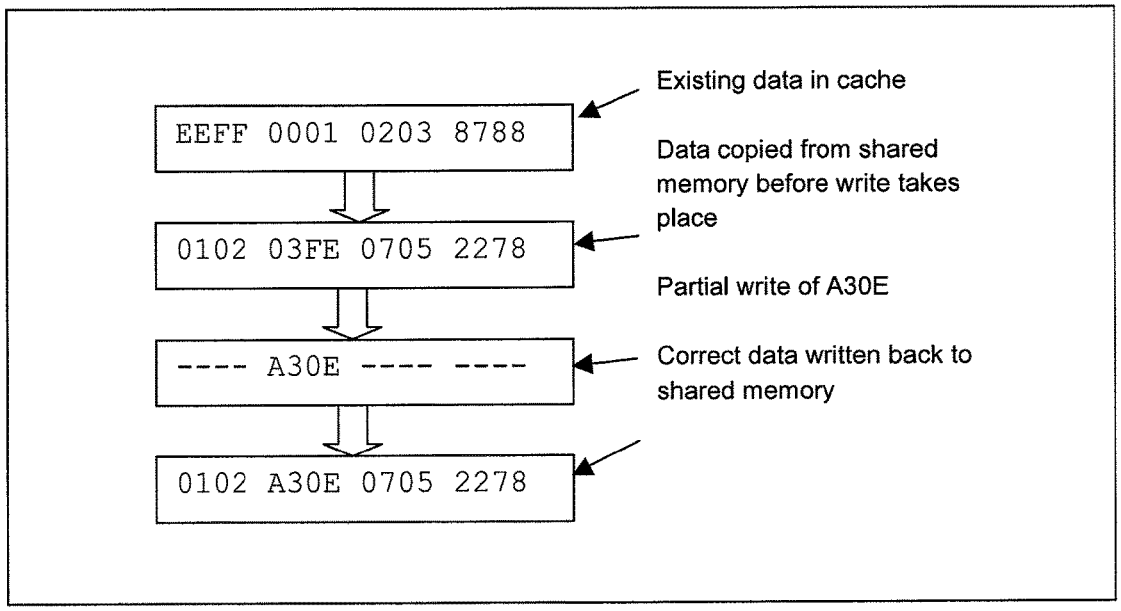
FIG. 4: Generation of correct data in shared memory during a partial WRITE instruction
Figure 5:
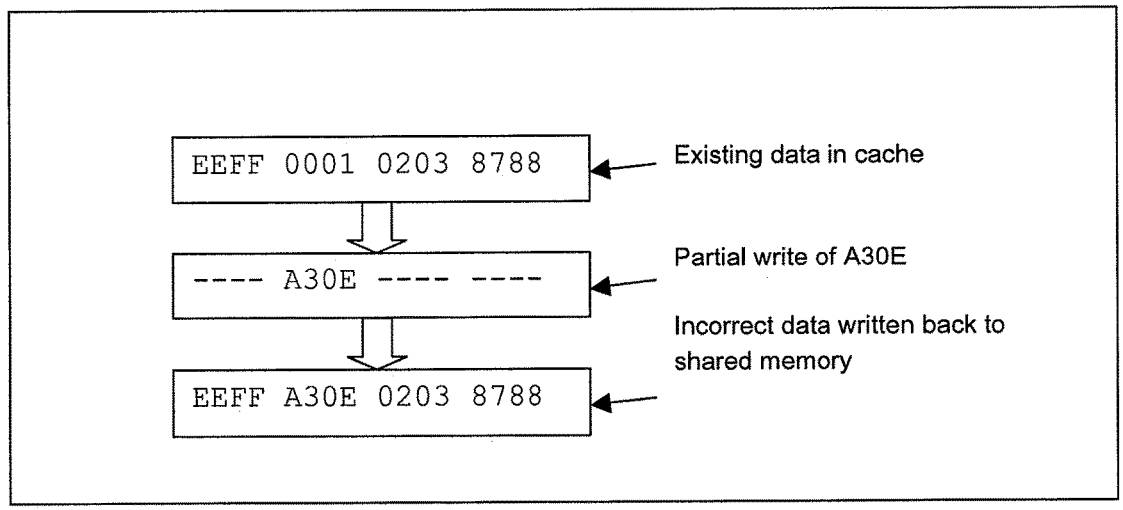
FIG. 5: Generation of incorrect data in shared memory during a partial WRITE instruction
Figure 6:
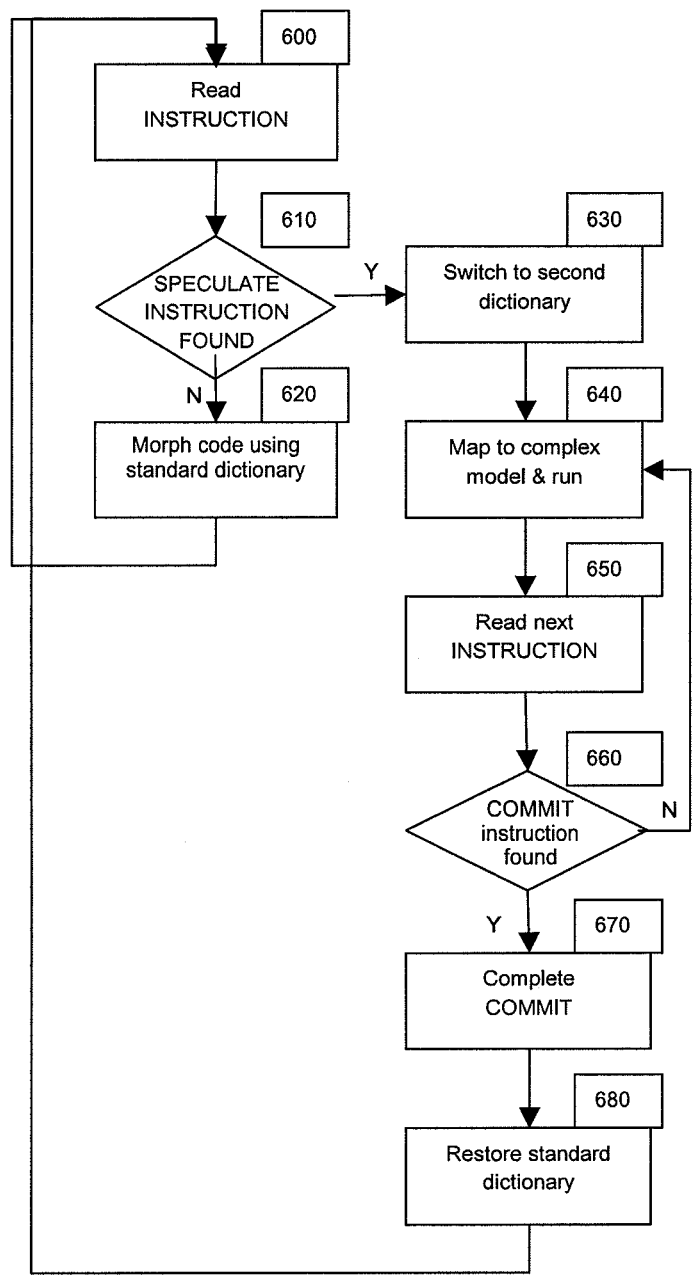
FIG. 6: Details of how the SPECULATE/COMMIT instructions control the use of dictionaries
Figure 7:
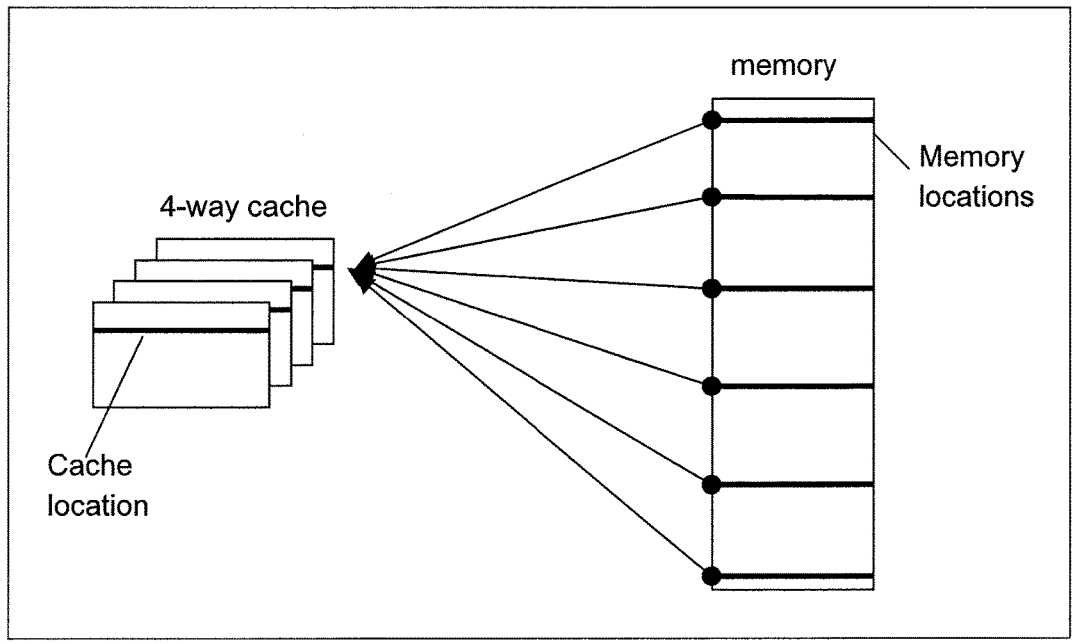
FIG. 7: Memory space is far larger than cache so many locations in memory will map to one location in cache in a simple 1 way cache arrangement.
Figure 8:
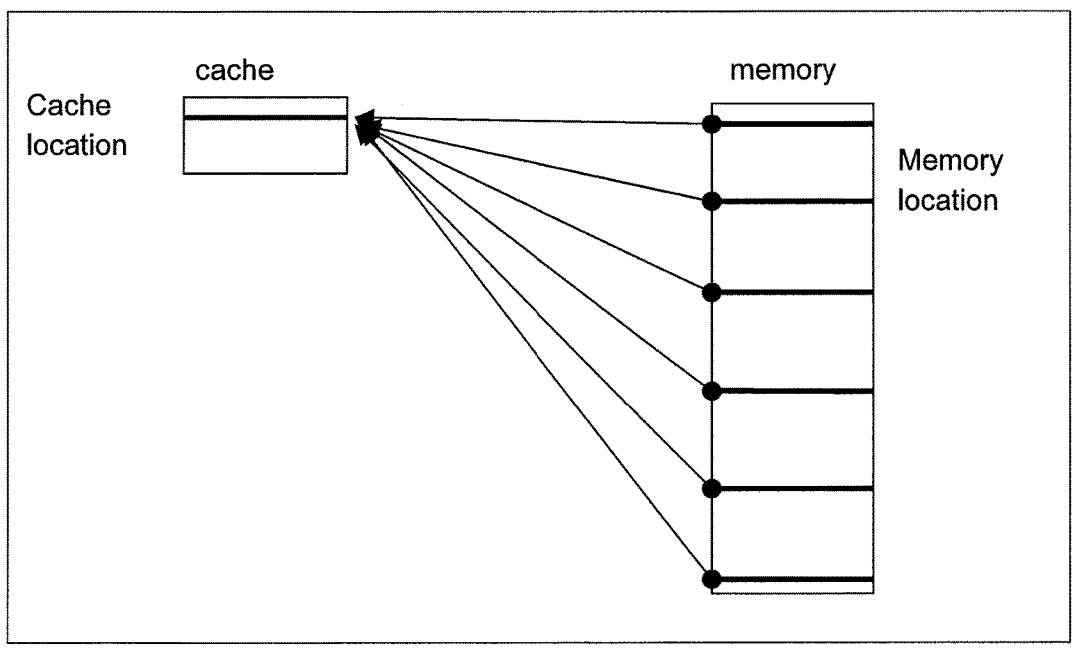
FIG. 8: In an n-way cache there are n different possible ways where the data directed to a particular cache address can be stored. This is known as the associativity of the cache.
Figure 9:
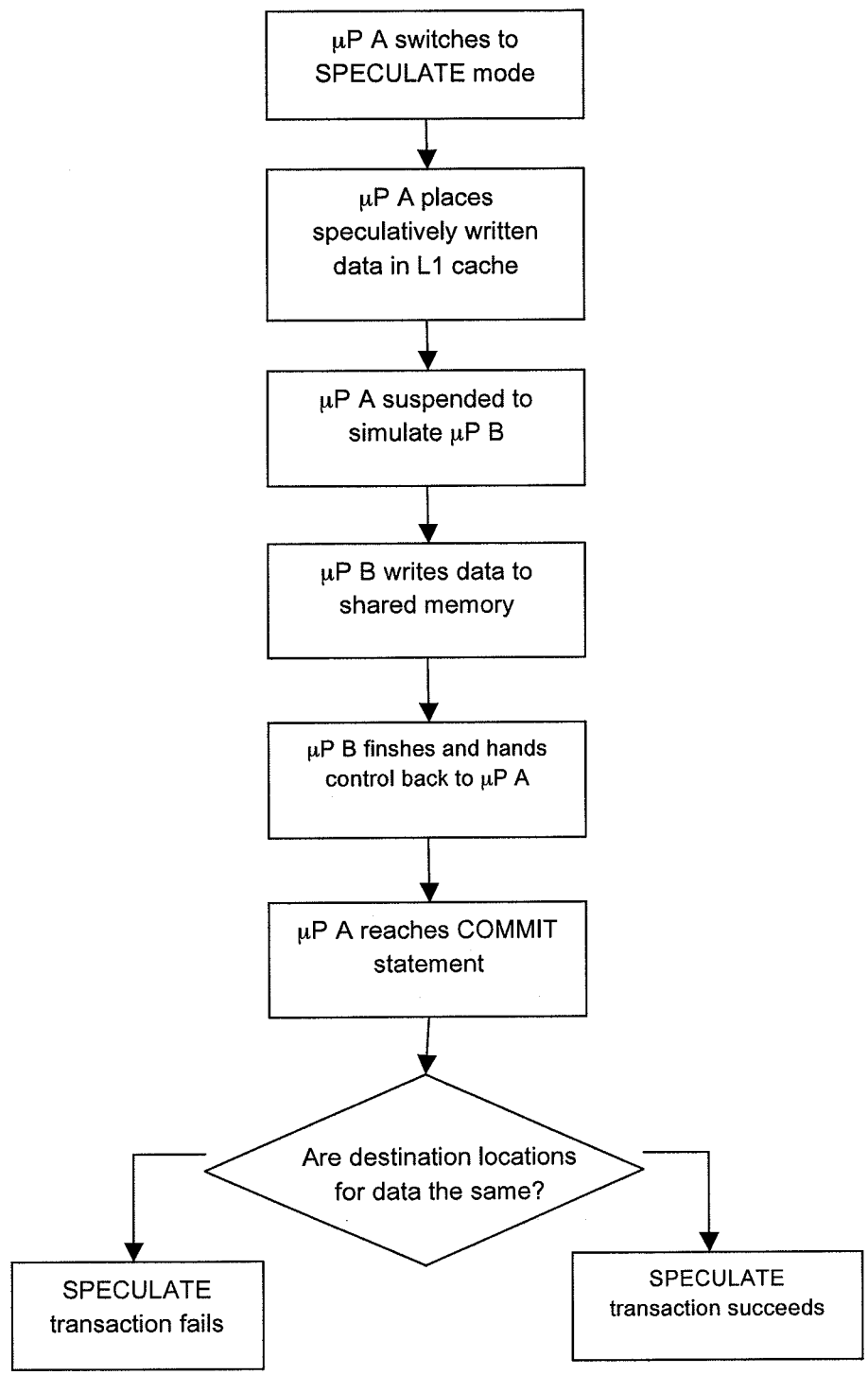
FIG. 9: Flow of operation in a multi-processor system if a processor (mP) in a SPECULATE/COMMIT region is suspended to allow simulation of a second or subsequent processor (mP).

An example for the SPECULATE/COMMIT Complex Access mode is as follows: At runtime the code is read by the simulator and processed instruction by instruction (FIG. 6). Each individual instruction is read 600 and checked to determine whether or not it is a SPECULATE instruction 610. If it is not a SPECULATE instruction it will be passed to the code morphing portion of the software which will map the instruction to native code using the standard code dictionary 620. The next instruction will be processed in the same way 600.

If a SPECULATE instruction is found 610 this causes the code morphing software to use a different dictionary 630 which contains the more complex models. Instructions will continue to be read 650 as before and each instruction will now be checked to determine whether or not it is a COMMIT instruction 660. If it is not, the instruction will be mapped using the complex modelling dictionary 640 and the next instruction read 650. If it is a COMMIT instruction then the COMMIT instruction will be mapped to the complex model 670 and the standard dictionary restored 680 before the next instruction is read 600.

Figure 10:
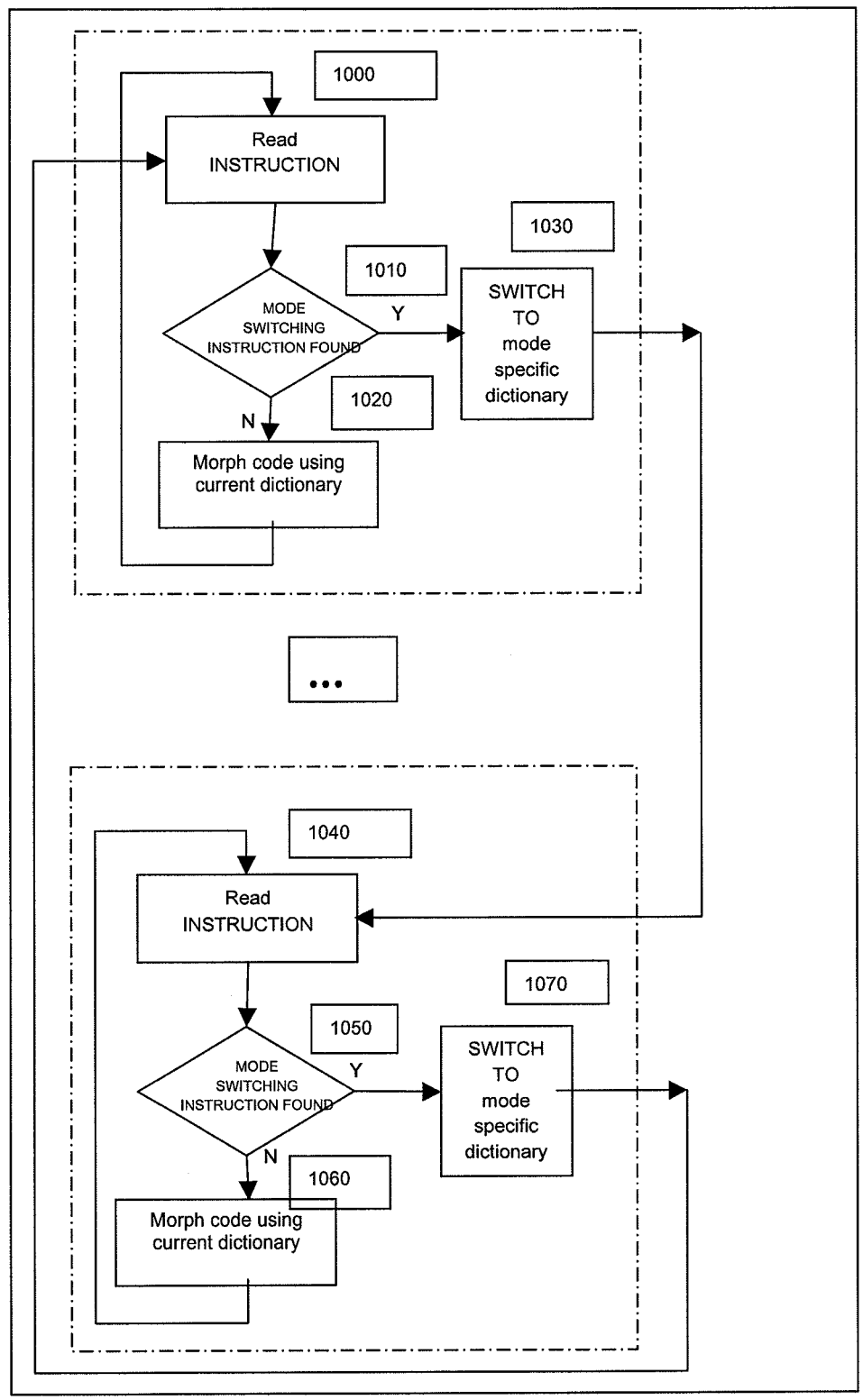
FIG. 10: Details of how mode change instructions control the use of multiple dictionaries.

The use of different dictionaries for different modes is shown in FIG. 10. At runtime the system code is read by the simulator and processed instruction by instruction (FIG. 10).

Each individual instruction is read 1000 and checked to determine whether or not it is a mode switching instruction 1010. If it is not a mode switching instruction it will be passed to the code morphing portion of the software which will map the instruction to native code using the current code dictionary 1020. The next instruction will be processed in the same way 1000.

If a mode switching instruction is found 1010 this causes the code morphing software to use a different dictionary 1030 which contains optimized code for that mode. Instructions will continue to be read 1040 as before and each instruction will now be checked to determine whether or not it is a mode switching instruction 1050. If it is not, the instruction will be mapped using the current dictionary 1060 and the next instruction read 1040. If it is a mode switching instruction then a switch to a new dictionary will be made 1070 before the next instruction is read 1000.

The invention claimed is:

1. A method of simulating a processor system by running system code that simulates the system on a host processor, in which the system code has two or more execution privilege levels or modes and is translated at run time to a form required by the host processor; comprising the steps of:
   (i) selecting a specific code dictionary from a set of two or more different code dictionaries, each execution privilege level or mode being associated with a different code dictionary;
   (ii) mapping all instructions to a native instruction set of the host processor using the code dictionary selected from the set of two or more different code dictionaries, in which, in a first mode, all instructions that are outside a SPECULATE/COMMIT region are mapped to a native instruction set of the host using the first code dictionary; and in which, in a second mode, all instructions within a SPECULATE/COMMIT region are mapped to the native instruction set of the host using a second code dictionary.

2. The method of claim 1 in which, if an instruction is encountered during runtime that changes the mode of the host processor, the code dictionary is switched to use the dictionary associated with the new mode.

3. The method of claim 1 in which the different modes require different instruction mappings to the native instruction set of the host using different models that more accurately represent the behaviour of the system code and hardware in the processor system being simulated.

4. The method of claim 1, in which a mode, associated with a specific dictionary, is a user mode, being a restricted mode and provides access to a subset of the resources of the processor and system.

5. The method of claim 1, in which a mode, associated with a specific dictionary, is a system mode, being an unrestricted mode and allows the processor to access all of the resources of the processor and system.

6. The method of claim 1, in which a mode, associated with a specific dictionary, is a hypervisor mode.

7. The method of claim 1, in which a mode, associated with a specific dictionary, is a virtual memory mode.

8. The method of claim 1, in which a mode, associated with a specific dictionary, is a physical memory mode.

* * * * *